April 20, 1965 W. TALBOT 3,178,946
ROTATING PENDULUM ACCELEROMETER
Filed Dec. 8, 1961 2 Sheets-Sheet 1

INVENTOR.
WARREN TALBOT
BY
R. E. Geauque
ATTORNEY

April 20, 1965  W. TALBOT  3,178,946
ROTATING PENDULUM ACCELEROMETER
Filed Dec. 8, 1961  2 Sheets-Sheet 2

INVENTOR.
WARREN TALBOT
BY
R.S. Geangue
ATTORNEY

United States Patent Office
3,178,946
Patented Apr. 20, 1965

3,178,946
ROTATING PENDULUM ACCELEROMETER
Warren Talbot, Woodland Hills, Calif., assignor, by mesne assignments, to Security First National Bank, Los Angeles, Calif., a national banking association
Filed Dec. 8, 1961, Ser. No. 157,906
8 Claims. (Cl. 73—517)

This invention relates to acceleration responsive devices and more particularly to an accelerometer having an acceleration responsive element rotatably mounted and including an unbalanced mass for measuring the direction and magnitude of acceleration applied in the plane of rotation of the unbalanced mass.

The apparatus of the invention measures planar acceleration forces and provides as an output an electrical signal suitable for use in the guidance system of aircraft, missiles of the like. To accomplish the intended function, the structure of the present invention drives an inertial mass and is responsive to the torsional flexure of the mass-carrying shaft to provide a measure of acceleration.

One means of measuring planar acceleration, prior to the present invention, employed line-responsive accelerometers which were continuously rotated about an axis normal to a given direction for measuring the direction and magnitude of acceleration applied in the plane of rotation; these devices have been relatively heavy, space consuming and expensive. Moreover, known apparatus is not only subject to the objections noted, but often include errors arising from friction, hysteresis, etc.

It is the general object of this invention to avoid and overcome objections to and difficulties of known apparatus for measuring planar acceleration by the provision of apparatus characterized by light weight, relatively small space requirements, inexpensiveness and simplicity, coupled with high efficiency and accuracy.

Another object of this invention is the provision of apparatus of the character described utilizing the principle of measuring the torsional flexure of an inertial mass carrying element responsive to acceleration applied in a plane.

Another object of the invention is to provide acceleration responsive means for providing an electrical output signal directly proportional to both a magnitude and direction of an applied planar acceleration.

A general object of this invention is to provide a new and improved accelerometer which overcomes disadvantages of previous means and methods heretofore intended to accomplish generally similar purposes.

The foregoing objects of the invention, and other objects which become apparent as the description proceeds, are achieved by apparatus for measuring planar acceleration and comprising an unbalanced inertia member, torque-sensitive means mounting the inertia member for resilient rotational movement about the axis of rotation of the inertia member, means for driving the inertia member, means for cancelling the effects of acceleration due to gravity, and torque sensitive means for indicating the direction and magnitude of applied accelerations.

For a better understanding of the invention, reference should be made to the accompanying drawings, wherein.

Figure 1:
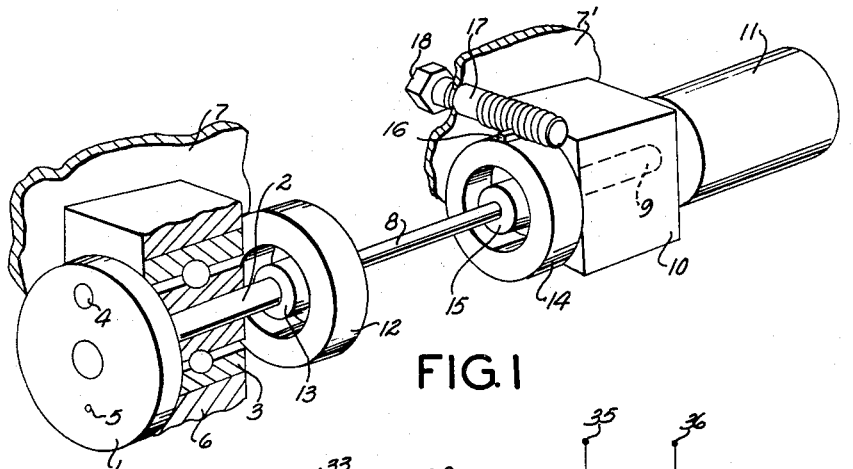
FIGURE 1 is a perspective view, partially in section, of apparatus employing the principles of the invention.

Referring to FIGURE 1 of the drawing, an acceleration responsive device is provided comprising an unbalanced inertia element 1 freely pivoted for rotation about an axis. In the illustrated embodiment, this element 1 is in the form of an eccentric mass carried on shaft 2, which in turn is rotatably mounted by bearing means 3. The eccentric mass may be a pendulum or a disc having a portion of its mass removed by making an off-center hole 4 therein, thus shifting the center of gravity to point 5. The disc is a non-symmetrical body. The bearing means 3 are mounted on the supporting frame 6 which is fixed with respect to the member whose acceleration is to be measured. Frame 6 may be fastened to any suitable housing, portions of which are shown at 7 and 7'.

Shaft 2 is mounted for rotation by bearing means 3, which for example, may be of the ball-bearing type. Shaft 2 is directly coupled to torsion rod 8, which in turn is coupled to shaft 9. Frame 10 carries a bearing assembly (not shown) which is similar to bearing assembly 3. Frame 10 is attached to housing 7'. Rotation is imparted to shaft 9 by means of a synchronous motor 11. The eccentric pendulum 1 is driven around in a plane that is perpendicular to the unbalance. A pair of angular position pickoffs are disposed at either end of torsion rod 8. Although any suitable pick-off device of well-known construction may be employed, in the present embodiment a pair of magnesyn pickoffs will be employed by way of example.

A magnesyn pickoff is a rotary inductor for remote position indication, consisting of a toroidally wound coil and a permanent magnet. The stator windings are wound on a toroidal form of easily saturable material such as permalloy. Surrounding the toroid itself, is a cylindrical stack of core laminations which act to complete the magnetic path when the permalloy has been saturated by A.-C. excitation. In the center of the toroid is a strong cylindrical permanent magnet, mounted on bearings. The cylindrical shape produces a uniform field around the peripheral toroid. Two taps are taken off at 120 degrees and 240 degrees from the ends of the stator coil, dividing it into three equal segments. The permanent magnet rotor will cause a magnetomotive force to be set up in each half of the annular core, and the core will be bisected by the axis of the poles of the magnet. Since the core is made of homogeneous material, symmetrical in shape and concentric with the magnet, the reluctance of the two magnetic paths will be the same. The A.-C. excitation will cause an alternating magnetomotive force to be set up in the core, which will be considered to cause a clockwise flux in the core at a specific time. The output will vary at twice the frequency of the fundamental flux and is therefore a second harmonic flux. The output voltage constitutes a voltage of a frequency double that of the impressed voltage, or a second harmonic voltage. This voltage is at a maximum at the points of the coil adjacent to the poles of the magnet.

Referring again to FIGURE 2, the stator 12 of one magnesyn is fixedly attached to frame 6 and encircles rotor 13 which is attached to shaft 2 and torsion rod 8. Similarly, stator 14 encircles rotor 15 which is attached to shaft 9 and torsion rod 8. Stator 14 is rotatably carried by frame 10 so that it may be turned through a small angle for adjustment purposes as will be described more completely hereinafter. The exterior case of stator 14 is provided with a screw follower 16 which engages the threads of screw 17. Housing 7' is provided with a receiving aperture for screw 17 so that by turning the head 18 of screw 17, the case of stator 14 will be angularly displaced.

Figure 2:
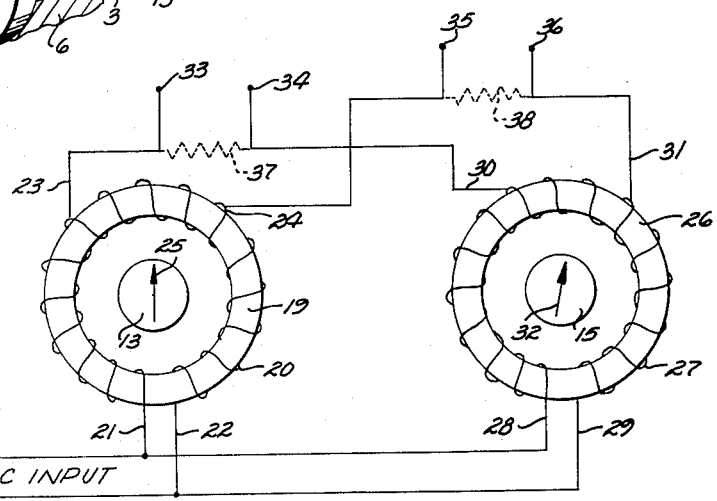
FIGURE 2 is a schematic circuit diagram of the electrical transducing apparatus incorporated in the apparatus of FIGURE 1.

Referring now to FIGURE 2, the magnesyn pick offs (12–15) comprise a magnetically permeable ring 19, carrying a toroidal winding 20 terminating at input leads 21 and 22 and having a 120° tap 23 and a 240° tap 24. The rotor 13 comprises a permanent magnet, the north pole of which is located at the head of arrow 25 and the south pole at the opposite end of arrow 25. Similarly, the second magnesyn of the pair comprises core 26, winding 27 having leads 28 through 31. Rotor 15 comprises a permanent magnet having its north and south poles oriented as indicated by arrow 32. The stator windings 20 and 27 are excited with a constant amplitude single-phase A.C. voltage. Rotation of either rotor (13 and/or 15) will amplitude modulate the A.C. excitation appearing at terminals 33–36 in accordance with the rotor's position. The relative amplitudes of the output from each magnesyn with respect to the other may be adjusted to a preselected level by means of resistors 37 and 38, or other suitable means.

Figure 3:
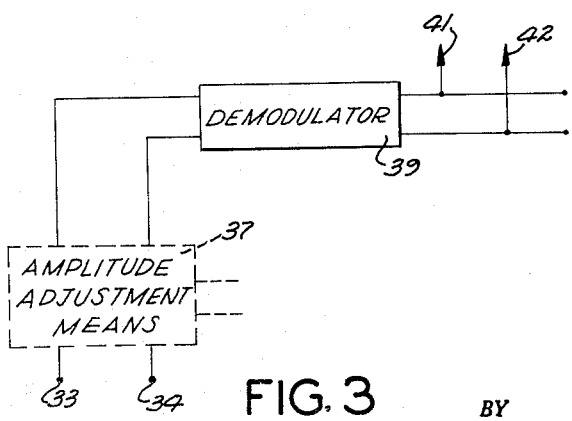
FIGURE 3 is a simplified block diagram illustrating the interconnection of the transducers with related detecting means.

Looking now at FIGURE 3, there is shown the manner in which a demodulator 39 is connected to terminals 33 and 34 via the amplitude adjustment means (e.g., resistor 37). The modulation envelope impressed on the excitation carrier is detected by demodulator 39 and provides the output signal at terminals 41 and 42.

Figure 4:
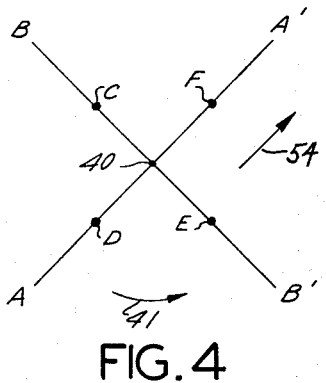
FIGURE 4 is a vector diagram illustrating planar acceleration forces acting on the apparatus.

There is shown in FIGURE 4 a vector diagram, useful in describing the planar acceleration forces acting on the device. Axes A–A' and B–B' define the plane of rotation of the inertia element 1. Rotation is about point 40. Initially assume that an acceleration is applied in the plane of rotation. The applied acceleration need not be parallel to any given axis; however, for purposes of describing the functioning of the apparatus, assume that the resultant of all accelerations applied is parallel to the plane of rotation. With the center of gravity of the inertia element 1 at point C, the torque on the torsion shaft, turning about point 40, is in the direction of rotation as indicated by arrow 41. When the center of gravity arrives at point E, the torque on the torsion shaft is opposed by the inertia element 1. With the inertia element at D or F, no torque is exerted on the torsion shaft. As can be seen from FIGURE 4, the torque that would have to be supplied to the inertia element would vary sinusoidally if constant angular velocity was to be maintained. The torsion of shaft 8 would vary slightly and is a sine wave if constant angular velocity is maintained.

The angular relationship (deflection) between the two rotors will vary with the magnitude of the applied acceleration. This is a function of the torque developed by the unbalanced mass and the spring rate of the torsion shaft 8. This deflection has a sine wave form, being a maximum when unbalance is at C or E and passing through zero at D and F. Note that the direction of deflection at point C is opposite that at point E. The direction of deflection is therefore related to the direction of the acceleration shown by the arrow 54 in FIGURE 4. If the direction of applied acceleration is reversed, the "sign" of the signal will reverse. In this way, the direction of the applied acceleration may be determined. Simultaneously, the magnitude of the applied acceleration may be determined and this is a function of the deflection of the torsion rod 8.

The magnesyn windings are connected together so that their outputs will buck each other and yield zero output at terminals 33–36 under zero acceleration, excluding acceleration due to gravity which will be discussed separately. The effect of gravity can be eliminated by placing the axis of rotation in a vertical position for calibration purposes. When an acceleration is applied in any direction at any angle to the axis of rotation, the output of magnesyn 12 will vary sinusoidally with the output of magnesyn 14. The magnitude of this output is proportional to the amplitude of the applied acceleration. The phase relation is an indication of the direction of the applied acceleration. The torque of the inertia member 1 passes through zero when its center of gravity lies along the axis of applied acceleration. At zero torque, the output of the two magnesyns is zero, hence, their null point can be used to accurately point the direction of any applied acceleration. This direction can be easily located with relation to the fixed axis to which the drive motor 11 is mounted.

Figure 5:
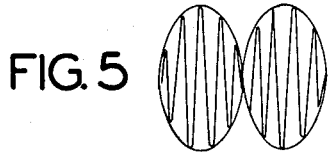
FIGURE 5 illustrates the wave form at the input of the apparatus of FIGURE 3.
Figure 6:
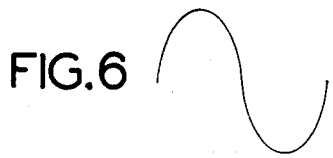
FIGURE 6 illustrates the wave form of the output signal from the circuit of FIGURE 3.
Figure 9:
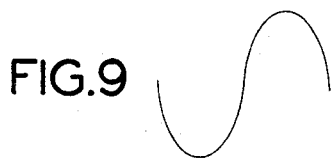
FIGURE 9 illustrates the wave form of the output from the apparatus of FIGURE 8.

The wave form as shown in FIGURE 5, illustrates the second harmonic of the A.C. carrier as modulated by the rotation of the magnesyn rotors. This envelope is demodulated by the detector means 39 and provides a sine wave ouptut as shown in FIGURE 6. This output may be cancelled by an opposing out of phase sine wave from the second magnesyn as shown in FIGURE 9.

As stated previously, there is a slight constant torsional load imparted to torsion rod 8 by the uniform rotary motion imparted by motor 11. This may be cancelled so that it does not appear in the combined output of the magnesyns by shifting the fixed angular position of the stator of one magnesyn with respect to the other. This is accomplished by means of adjustment screw 17 which will permit stator 14 to be rotated with respect to stator 12 by an amount sufficient to overcome the constant torsional load on rod 8 imparted by the constant drive of motor 11.

It may be desirable to cancel the acceleration due to gravity applied to inertia element 1. This may be done by cancelling the output signal generated by acceleration due to gravity with an opposing signal. Such an out-of-phase signal may be generated by the apparatus of FIGURE 7.

Figure 8:
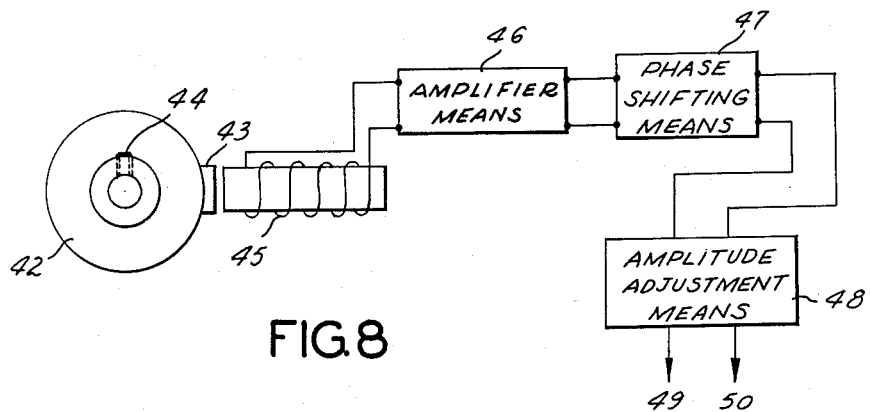
FIGURE 8 is a schematic diagram of the apparatus of FIGURE 7.
Figure 7:
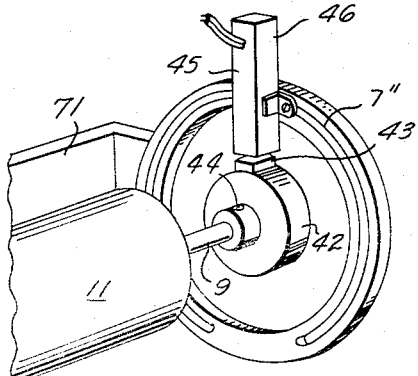
FIGURE 7 illustrates a modification of the apparatus of FIGURE 1 for generating a compensation signal.

Looking now at FIGURE 7, the end of the motor drive shaft 9 opposite from that driving torsion rod 8, has attached thereto a collar 42 to which is attached a permanent magnet 43. Collar 42 is attached to shaft 9 by set screw 44 or other suitable fastening means. Frame 7' is extended to provide a mounting ring portion 7" to which is attached a pickup coil 45. Pickup coil 45 is wound on a soft iron core carried within housing 46. Each time that permanent magnet 43 moves past the end of coil 45, there is induced therein an A.C. sine wave as shown in FIGURE 6 or 9. Referring now to FIGURE 8, the sine wave output from coil 45 is amplified via amplifier 46 and phase shifted by an amount necessary to oppose the output generated by the magnesyns in response to acceleration due to gravity. The amplitude of the compensation signal obtained via phase shifting means 47 may be adjusted by means of attenuator 48 so that the compensation signal appearing at terminals 49 and 50 matches the amplitude of the gravity output signal of the magnesyns.

Damping means may be provided for preventing oscillatory vibrations from being generated by a sudden displacement of the apparatus. It will readily be appreciated by those skilled in the art that various forms of damping may be used, e.g., electromagnetic, pneumatic or hydraulic dampers. Furthermore, although an effective means for damping will be described hereinafter, a greater or lesser degree of damping may be required for any particular set of design requirements, so that in some cases, no damping means, as such, will be needed.

Figure 10:
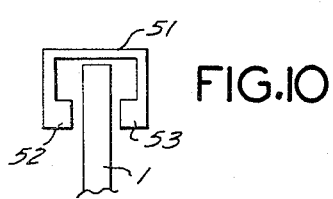
FIGURE 10 illustrates damper means applicable to the apparatus of FIGURE 1.

Looking now at FIGURE 10, there is shown a device suitable for providing damping to the system. In this embodiment, a permanent magnet 51 having its poles 52 and 53 facing on either side of inertia element 1 will provide a magnetic drag for damping any small oscillatory vibrations which may result from the apparatus being accelerated at frequencies near the natural frequency of vibrations of the elements comprising the system.

Summarizing, the rotors 13 and 15 of the two magnesyns are coupled together via the torsion rod 8 and rotate with the pendulous inertia member 1. Any acceleration acting on this system will cause proportional relative motion between the two magnesyn rotors 13 and 15. This relative motion is proportional to the applied acceleration and spring constant of the torsion rod 8. From the output of the magnesyns, the resultant of all acceleration in a plane may be measured, and does not require close control over the torque driving the inertia element 1. Since the apparatus measures the total (resultant) acceleration in a plane, only a single device is required; heretofore, two devices would be required to measure the resultant.

In the foregoing discussion, the output signal has been considered generally in terms of displacement between the ends of the torsion rod. However, it will be apparent to those skilled in the art that the output signal also may be considered in terms of the time domain. That is, the time required for the pendulum to travel through a given arc is also a function of applied acceleration. This is the result of deflection of the torsion rod. When the pendulum is in line with the applied acceleration, no torque exists and there will be zero deflection between the ends of the torsion rod. When the pendulum is oriented 90 degrees to the applied acceleration, the torque will be at a maximum and the end of the torsion rod carrying the pendulum will lead the motor-driven end by an angle proportional to the spring rate of the rod and moment of mass. Inasmuch as the motor shaft rotates at a substantially constant angular velocity, the magnitude of the angle by which one end of the rod leads the other end may be expressed in terms of time. That is, the angular velocity of one end of the torsion rod will be more or less than that of the motor velocity, as determined by externally applied acceleration. Since angular velocity and time are related, the measurement of time will therefore provide a measure of applied acceleration. That is, the time for a given angular travel of the pendulum is a function of spring rate and applied acceleration. Thus, the ancillary apparatus for utilizing the output signal of the present invention may be any suitable and well-known time interval measuring means.

From the foregoing, it will be recognized that the various objects of the invention have been achieved by the provision of compact, yet highly efficient apparatus for measuring the resultant acceleration in a plane. The principles of the invention have been particularly described in conjunction with magnesyn pickoffs for indicating the torsional effect of applied acceleration which comprise the preferred embodiments of the invention, but other transducing devices capable of performing with similar characteristics described can be employed.

While certain representative embodiments and details have been shown for the purpose of illustrating the invention, it will be apparent to those skilled in this art that various changes and modifications may be made therein without departing from the spirit and scope of the invention.

What is claimed is:

1. An accelerometer comprising a rotatable inertia element displaced from its axis of rotation and adapted to rotate continuously in one direction in a plane transverse to said axis, means by which a uniform rotational torque may be applied to said rotatable element, a torsion rod connecting said rotatable element and said torque applying means, first and second transducers coupled to opposite ends of said rod and responsive to angular displacement of the ends of said rod in response to linear acceleration of said accelerometer to generate a signal proportional to the resultant of linear acceleration applied in the plane of rotation of said inertia element.

2. An accelerometer as defined in claim 1 wherein said inertia element comprises a disc having its center of gravity displaced from its axis of rotation.

3. An accelerometer as defined in claim 1 wherein said torque applying means comprises a synchronous motor.

4. An accelerometer as defined in claim 1 wherein said transducers comprise magnesyns having tapped stator windings and permanent magnet rotor windings being connected in opposition whereby only a difference in relative position of the rotors of said magnesyns will generate an output signal.

5. Apparatus for measuring the resultant of acceleration applied in a rotatable plane comprising a pendulous inertia element displaced from its axis of rotation, means for continuously rotating said element about said axis, said rotating means including a torsion rod coaxial with said axis for supporting said element, transducing means responsive to torque applied to said rod by linear acceleration of said apparatus for generating an output signal proportional to said torque thereby providing a measure of resultant linear acceleration in said plane; and compensating means for cancelling the effect on said transducing means of acceleration due to gravity acting on said element.

6. Apparatus as defined in claim 5 wherein said compensating means comprises alternating current generating means for generating a sine wave cycle for each revolution of said rotating means, and phase shifting means connecting said generating means with said transducing means.

7. Apparatus as defined in claim 6 wherein said transducing means comprises first and second magnesyns rotatably coupled to opposite ends of said torsion rod, said magnesyns having their outputs connected in opposition to provide an output only in the presence of an acceleration applied to said inertia element.

8. A rotating pendulum accelerometer comprising a frame, a pendulum rotatably carried on said frame with the pendulum mass displaced from the axis of rotation of said pendulum, means mounted on said frame for continuously rotating said pendulum in a plane transverse to said axis at a uniform rate, a torsion rod intermediate said pendulum and said rotating means through which rotary motion of said rotating means is imparted to said pendulum, first and second electrical pickoffs connected to opposite ends of said rod for generating electrical signals indicating the relative angular position of the corresponding ends of said rod, means connecting the electrical outputs of said pickoffs in opposition whereby an output signal will be generated in response to a difference in the relative angular positions of the ends of said rod, compensating means operative on said output signal to cancel the effect of displacement due solely to gravity acting on said pendulum mass, said difference being directly proportional to acceleration applied in the plane of rotation of said pendulum.

References Cited by the Examiner
UNITED STATES PATENTS

| | | | |
|---|---|---|---|
| 2,193,079 | 3/40 | Schrader | 73—70.1 |
| 2,726,074 | 12/55 | Ketchledge | 73—503 |
| 2,873,103 | 2/59 | Hautly | 73—516 |
| 2,936,624 | 5/60 | Schalkowsky | 73—516 |
| 3,014,374 | 12/61 | Johnston | 73—517 |

RICHARD C. QUEISSER, *Primary Examiner.*

J. E. WEST, JAMES J. GILL, *Examiners.*